(12) United States Patent
Okimura et al.

(10) Patent No.: US 8,210,609 B2
(45) Date of Patent: Jul. 3, 2012

(54) DAMPER AND VEHICLE SEAT HAVING THE DAMPER

(75) Inventors: Akihiko Okimura, Kanagawa (JP); Naohiro Horita, Kanagawa (JP); Yoshiteru Igarashi, Kanagawa (JP)

(73) Assignee: Oiles Corporation, Tokyo (JP)

( * ) Notice: Subject to any disclaimer, the term of this patent is extended or adjusted under 35 U.S.C. 154(b) by 329 days.

(21) Appl. No.: 12/597,212

(22) PCT Filed: Apr. 25, 2008

(86) PCT No.: PCT/JP2008/001108
§ 371 (c)(1),
(2), (4) Date: Oct. 23, 2009

(87) PCT Pub. No.: WO2008/136192
PCT Pub. Date: Nov. 13, 2008

(65) Prior Publication Data
US 2010/0164262 A1 Jul. 1, 2010

(30) Foreign Application Priority Data
Apr. 27, 2007 (JP) ................. 2007-120353

(51) Int. Cl.
*B60N 2/427* (2006.01)
*F16F 9/14* (2006.01)
*F16D 57/00* (2006.01)

(52) U.S. Cl. ............... 297/216.12; 267/124; 188/290

(58) Field of Classification Search ............ 297/216.12, 297/216.1, 216.13, 216.14; 267/121, 124; 188/290, 280, 291, 293, 294
See application file for complete search history.

(56) References Cited

U.S. PATENT DOCUMENTS
4,893,522 A * 1/1990 Arakawa ............ 464/180
(Continued)

FOREIGN PATENT DOCUMENTS
JP 12768/1983 8/1984
(Continued)

OTHER PUBLICATIONS
International Search Report for PCT/JP2008/001108, mailed Aug. 5, 2008.
(Continued)

Primary Examiner — Milton Nelson, Jr.
(74) Attorney, Agent, or Firm — Nixon & Vanderhye P.C.

(57) ABSTRACT

A damper 1 includes a vessel 2; a partitioning member 6 which partitions the interior of the vessel 2 into two accommodation chambers 4 and 5 for accommodating a viscous fluid 3, and which rotates together with the vessel 2 in an R direction and is movable in an axial direction A; a moving force imparting means 7 for imparting to the partitioning member 6 a moving force in an A1 direction by the input of rotation in an R1 direction; a resilient means 8 for resiliently urging the partitioning member 6 in an A2 direction; a through hole 9 for allowing the two accommodation chambers 4 and 5 inside the vessel 2 to communicate with each other; and an allowing/limiting member 10 which allows the viscous fluid 3 accommodated in the two accommodation chambers 4 and 5 in the vessel 2 to flow reciprocally between the two accommodation chambers 4 and 5 through the through hole 9, and which limits the flow of the viscous fluid 3 in the accommodation chamber 4 into the accommodation chamber 5 in the A2 direction through the through hole 9 when the internal pressure of the viscous fluid 3 accommodated in the accommodation chamber 4 in the A1 direction is generated in excess of a fixed value on the basis of the movement of the partitioning member 6 in the A1 direction.

9 Claims, 10 Drawing Sheets

U.S. PATENT DOCUMENTS

| | | | | |
|---|---|---|---|---|
| 6,840,355 | B2 * | 1/2005 | Iwashita | 188/290 |
| 2007/0158153 | A1 * | 7/2007 | Kanno et al. | 188/290 |
| 2009/0261634 | A1 * | 10/2009 | Okimura et al. | 297/216.12 |
| 2010/0117409 | A1 * | 5/2010 | Igarashi et al. | 297/216.12 |

FOREIGN PATENT DOCUMENTS

| | | |
|---|---|---|
| JP | 6-33966 | 2/1994 |
| JP | 06-033966 | 2/1994 |
| JP | 10-119619 | 5/1998 |
| JP | 10-181403 | 7/1998 |
| JP | 10-311359 | 11/1998 |
| JP | 10-331895 | 12/1998 |
| JP | 10331895 A * | 12/1998 |
| JP | 11-268566 | 10/1999 |
| JP | 2003-081044 | 3/2003 |
| JP | 2003-81044 | 3/2003 |
| JP | 2003-176844 | 6/2003 |
| JP | 2003-267108 | 9/2003 |
| JP | 2005-225334 | 8/2005 |
| JP | 2006-082772 | 3/2006 |
| JP | 2006-088875 | 4/2006 |
| WO | WO 2005/095821 | 10/2005 |
| WO | WO 2005/095821 A1 | 10/2005 |

OTHER PUBLICATIONS

Microfilm of the Specification and drawings annexed to the request of JP Model Application No. 17268/1983 (Laid-open No. 123733/1984), (Aug. 20, 1984).

* cited by examiner

DAMPER AND VEHICLE SEAT HAVING THE DAMPER

This application is the U.S. national phase of International Application No. PCT/JP2008/001108 filed 25 Apr. 2008, which designated the U.S. and claims priority to Japan Application No. 2007-120353 filed 27 Apr. 2007, the entire contents of which are hereby incorporated by reference.

TECHNICAL FIELD

The present invention relates to a damper for absorbing an impact, and more particular to a damper suitable for use in a vehicle seat having a headrest for supporting the head of a seated person by moving forward when, at the time of such as a collision of a vehicle, the seated person moves backward due to inertia upon receiving an impact from the rear, as well as a vehicle seat having the damper.

BACKGROUND ART

Patent Document 1: JP-A-10-181403
Patent Document 2: JP-A-10-119619
Patent Document 3: JP-A-11-268566
Patent Document 4: JP-A-2003-81044
Patent Document 5: JP-A-2003-176844
Patent Document 6: JP-A-2005-225334
Patent Document 7: JP-A-2006-82772
Patent Document 8: JP-A-2006-88875

In vehicles, vehicle seats have been proposed in which a headrest is adapted to move forward to restrict the head of a seated person at the time of such as a collision.

DISCLOSURE OF THE INVENTION

Problems that the Invention is to Solve

Shock absorbing dampers which are used in such vehicle seats are required to be such that, in the collision at the time of low speed, the impact caused by the collision is absorbed softly in order to support the head so as not to impart the impact, whereas, in the collision at the time of high speed, the impact is absorbed with stiffness corresponding to the magnitude of the impact at the time of the collision so as to absorb the impact due to the collision by becoming stiff in order to support the head reliably.

The present invention has been devised in view of the above-described aspects, and an object of the invention is to provide a damper capable of softly absorbing an impact when the impact is small, and of becoming stiff and positively holding an impact-absorbed body, e.g., the head, when the impact is large.

Another object of the invention is to provide a vehicle seat having a mechanism which is capable of positively moving the headrest in the forward direction only at the time of such as a collision by properly discriminating the time of such as a collision and the time of a non-collision, and which can be compactly installed in a backrest and the like.

Means for Solving the Problems

A damper in accordance with the present invention comprises: a vessel; a partitioning member which partitions an interior of the vessel into two accommodation chambers for accommodating a viscous fluid, and which rotates together with the vessel about an axis of the vessel and is movable in an axial direction of the vessel; moving force imparting means for imparting to the partitioning member a moving force in one axial direction by the input of relative rotation about the axis of the vessel with respect to the vessel, so that a moving velocity is set to one corresponding to a rotating velocity of the input of rotation; resilient means for resiliently urging the partitioning member in another axial direction; a through hole formed in the partitioning member so as to allow the two accommodation chambers inside the vessel to communicate with each other; and an allowing/limiting member which is resiliently urged in the one axial direction to allow the viscous fluid accommodated in the two accommodation chambers in the vessel to flow reciprocally between the two accommodation chambers through the through hole, and which limits the flow of the viscous fluid in the accommodation chamber in the one axial direction into the accommodation chamber in the other axial direction through the through hole against the resilient urge in the one axial direction allowing that flow, when the internal pressure of the viscous fluid accommodated in the accommodation chamber in the one axial direction is generated in excess of a fixed value on the basis of the movement of the partitioning member in the one axial direction.

According to the above-described damper, in the case of the input of rotation at a low velocity not exceeding a fixed value, the partitioning member is moved in one axial direction at a low velocity not exceeding the fixed value, and the internal pressure of the viscous fluid accommodated in the accommodation chamber in the one axial direction of the vessel does not exceed a fixed value. Therefore, the viscous fluid accommodated in the accommodation chamber in the one direction is allowed to flow into the accommodation chamber in the other direction through the through hole, with the result that a resultant damping force, i.e., a reaction force with respect to the input of rotation, is set to a magnitude which is based on the flow resistance in the case where the viscous fluid flows through the through hole. On the other hand, in the case of the input of high-speed rotation exceeding the fixed value, the partitioning member is moved in the one axial direction at a high velocity exceeding the fixed value, and the internal pressure of the viscous fluid accommodated in the accommodation chamber in the one axial direction of the vessel exceeds a fixed value. Therefore, the flow of the viscous fluid accommodated in the accommodation chamber in the one direction of the vessel into the accommodation chamber in the other axial direction of the vessel through the through hole is inhibited. As a result, a resultant damping force, i.e., a reaction force with respect to the input of rotation, assumes a magnitude which is based on the compression resistance of the viscous fluid in the accommodation chamber in the one axial direction. Thus, in the case of the input of low-speed rotation not exceeding a fixed value in which case the impact is small, the impact is absorbed softly, whereas in the case of the input of high-speed rotation exceeding the fixed value in which case the impact is large, the damper becomes stiff so as to be able to positively hold the impact-absorbed body.

In a preferred example, the moving force imparting means includes a rotatable member disposed rotatably in the vessel; and inclined surface means having inclined surfaces which are formed between an axial one end face of the rotatable member and an axial one end face of the partitioning member opposing that one end face and which are inclined with respect to the axial direction. In such a moving force imparting means, the inclined surface means may include a plurality of rotatable member projections formed integrally on the one end face of the rotatable member projectingly in the one axial direction, and arranged in a direction about the axis, and a plurality of partitioning member projections formed integrally on the one end face of the partitioning member projectingly in the other axial direction, and arranged in the direction about the axis so as to mesh with the rotatable member projections. In the case of such inclined surface means, the inclined surfaces are formed on the rotatable member projections and the partitioning member projections, respectively, so as to be brought into sliding contact with each other.

In a preferred example, the allowing/limiting member may have a lid portion which is opposed to an axial one open end of the through hole at an axial other end face of the partitioning member and is disposed movably in the axial direction. In this case, the allowing/limiting member may have at least a pair of mutually spaced-apart projections formed integrally on the lid portion projectingly in the other axial direction and fitted in the through hole movably in the axial direction. At any rate, the damper may have resilient means for urging the lid portion in the one axial direction.

As the resilient means for urging the lid portion in the one axial direction, the damper may have a coil spring disposed between an axial one end face of the lid portion and the axial other end face of the partitioning member, or in substitution thereof or in conjunction therewith, the damper may have elastic deformation generating means which has an engaging projection formed integrally with the projection and an engaged projection adapted to engage that engaging projection and formed integrally with the partitioning member at the through hole, such that the lid portion is adapted to be urged in the axial one direction by the elastic deformation of the projection due to the riding of the engaging projection onto the engaged projection in the movement of the engaging projection in the axial other direction with respect to the partitioning member.

As the viscous fluid used in the invention, silicone oil of 100 to 1000 cst is suitable, but is not limited to the same.

A vehicle seat in accordance with the invention comprises: a backrest of a vehicle; a headrest supported by the backrest movably in a forward direction of the vehicle; movement urging means for urging the headrest to move in the forward direction; an inhibition mechanism for inhibiting the movement of the headrest in the forward direction; and canceling means for canceling the inhibition by the inhibition mechanism of the movement of the headrest in the forward direction when a moving velocity applied to the backrest in a backward direction of the vehicle has exceeded a fixed value, the canceling means having a load-rotation converting mechanism for converting a load applied to a back receiving portion of the backrest into a rotational force and a transmitting mechanism for transmitting to the inhibition mechanism the force on the basis of the moving velocity applied to the backrest in the backward direction of the vehicle and exceeding the fixed value, the transmitting mechanism having the damper according to any one of the above-described aspects, wherein one of the vessel and the partitioning member of the damper is coupled to the load-rotation converting mechanism so as to receive the rotational force from the load-rotation converting mechanism as an input of rotation, and another one of the vessel and the partitioning member of the damper is coupled to the inhibition mechanism so as to transmit to the inhibition mechanism the force applied to the backrest in the backward direction of the vehicle on the basis of the moving velocity exceeding the fixed value.

According to the vehicle seat in accordance with the invention, the canceling means, which cancels the inhibition by the inhibition mechanism of the movement of the headrest in the forward direction when a moving velocity applied to the backrest in a backward direction of the vehicle has exceeded a fixed value, has a transmitting mechanism for transmitting to the inhibition mechanism the force on the basis of the moving velocity applied to the backrest in the backward direction of the vehicle and exceeding the fixed value. Therefore, the above mechanism and means are capable of positively moving the headrest in the forward direction only at the time of such as a collision by properly discriminating the time of such as a collision and the time of a non-collision, and can be compactly installed in the backrest and the like.

In the vehicle seat in accordance with the invention, the load-rotation converting mechanism may have a load receiving plate supported rotatably by a frame of the backrest and disposed in the back receiving portion of the backrest.

The headrest may be supported by the backrest forwardly rotatably or translatably, the movement urging means may be adapted to urge the headrest to forwardly rotate or translate, and the inhibition mechanism may be adapted to inhibit the rotation or translation of the headrest in the forward direction.

Advantages of the Invention

According to the invention, it is possible to provide a damper capable of softly absorbing an impact when the impact is small, and of becoming stiff and positively holding an impact-absorbed body, e.g., the head, when the impact is large. In addition, it is possible to provide a vehicle seat having a mechanism which is capable of positively moving the headrest in the forward direction only at the time of such as a collision by properly discriminating the time of such as a collision and the time of a non-collision, and which can be compactly installed in the backrest and the like.

Hereafter, a more detailed description will be given of the mode for carrying out the invention with reference to the preferred embodiments shown in the drawings. It should be noted that the present invention is not limited to these embodiments.

BEST MODE FOR CARRYING OUT THE INVENTION

Figure 1:
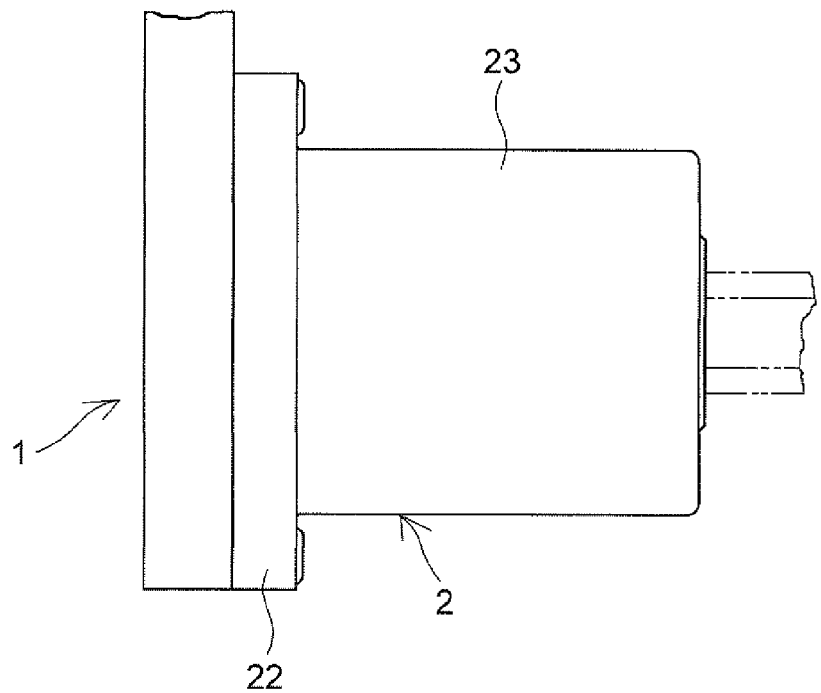
FIG. 1 is an explanatory side elevational view of a preferred embodiment in accordance with the invention.

In FIGS. 1 to 13, a damper 1 in accordance with this embodiment is comprised of a vessel 2; a partitioning member 6 which partitions the interior of the vessel 2 into two accommodation chambers 4 and 5 for accommodating a viscous fluid 3, and which rotates together with the vessel 2 in an R direction about an axis O of the vessel 2 and is movable in an axial direction A of the vessel 2; a moving force imparting means 7 for imparting to the partitioning member 6 a moving force in an A1 direction, i.e., one direction in the axial direction A, by the input of relative rotation about the axis O in an R1 direction, i.e., one direction in the R direction, with respect to the vessel 2, so that the moving velocity is set to one corresponding to the rotating velocity of that input of rotation; a resilient means 8 for resiliently urging the partitioning member 6 in an A2 direction which is the other direction in the axial direction A; a through hole 9 formed in the partitioning member 6 so as to allow the two accommodation chambers 4 and 5 inside the vessel 2 to communicate with each other; and an allowing/limiting member 10 which is resiliently urged in the A1 direction to allow the viscous fluid 3 accommodated in the two accommodation chambers 4 and 5 in the vessel 2 to flow reciprocally between the two accommodation chambers 4 and 5 through the through hole 9, and which limits the flow of the viscous fluid 3 in the accommodation chamber 4 into the accommodation chamber 5 in the A2 direction through the through hole 9 against the resilient urge in the A1 direction allowing that flow, when the internal pressure of the viscous fluid 3 accommodated in the accommodation chamber 4 in the A1 direction is generated in excess of a fixed value on the basis of the movement of the partitioning member 6 in the A1 direction.

The vessel 2 includes a hollow cylindrical portion 23 integrally having an inside diameter-side collar portion 21 at its end in the axial direction A and an outside diameter-side collar portion 22 at its other end, respectively, as well as a closure member 28 with an arm portion 27, the outside diameter-side collar portion 22 of the hollow cylindrical portion 23 being secured to the closure member 28 by rivets or screws 24, the closure member 28 integrally having on its one end face 25 in the axial direction A a plurality of, i.e., in this embodiment three, semi-cylindrical projections 26 projecting in the A2 direction.

An annular groove 31 for accommodating an O-ring 30, which is brought into resilient contact with the end face 25, is formed at one end portion 29 in the axial direction A of the outside diameter-side collar portion 22, while the plurality of projections 26 are arranged at equiangular intervals in the R direction.

Figure 4:
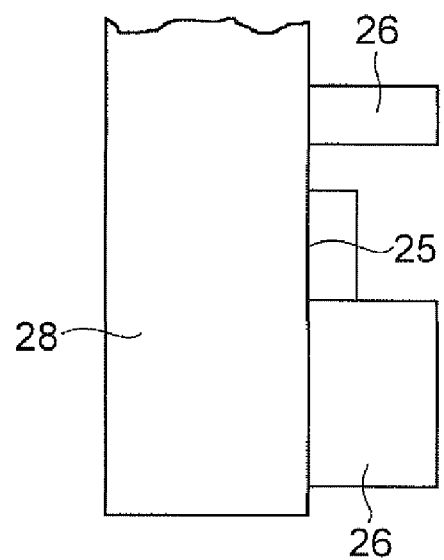
FIG. 4 is an explanatory partial enlarged side elevational view of a vessel in the embodiment shown in FIG. 1.
Figure 5:
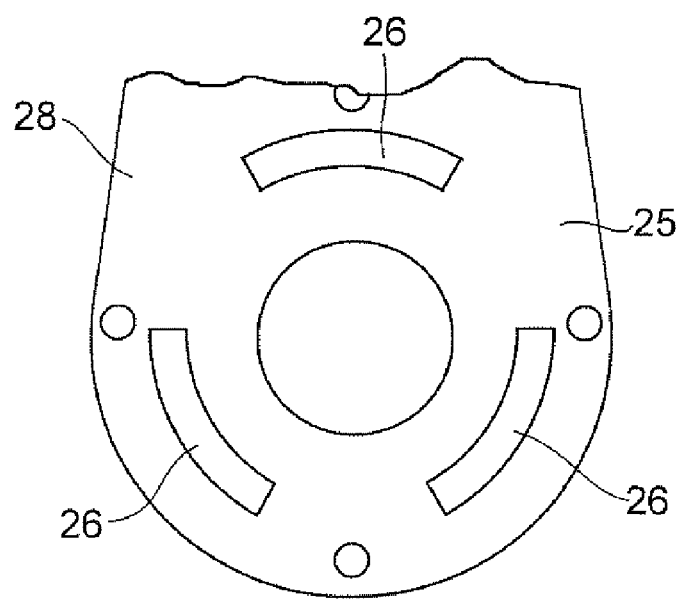
FIG. 5 is an explanatory partial right side elevational view of the vessel shown in FIG. 4.
Figure 6:
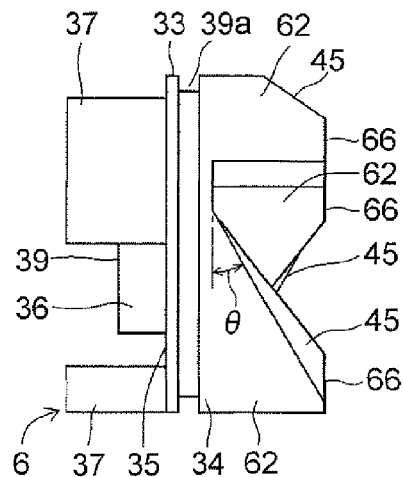
FIG. 6 is an explanatory side elevational view of a moving force imparting means and the like in the embodiment shown in FIG. 1.
Figure 7:
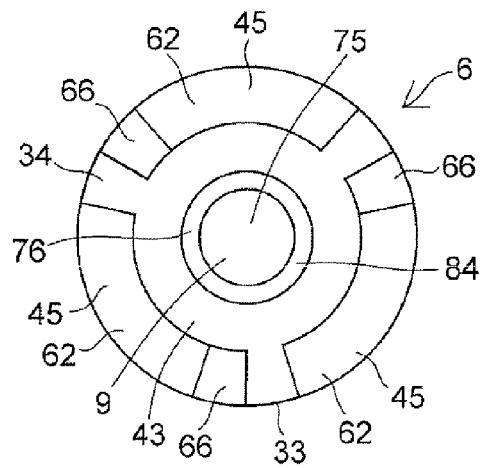
FIG. 7 is an explanatory partial right side elevational view of a partitioning member and the moving force imparting means shown in FIG. 6.
Figure 8:
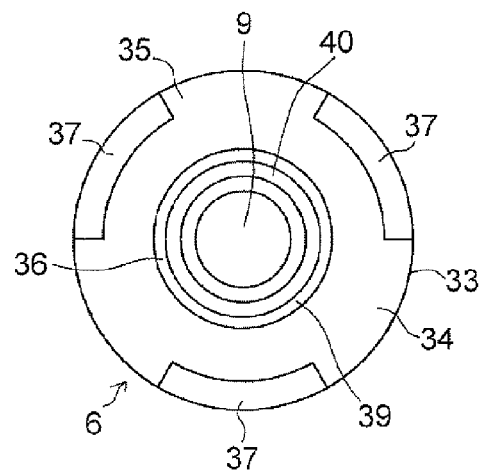
FIG. 8 is an explanatory partial left side elevational view of the partitioning member and the moving force imparting means shown in FIG. 6.

As shown in particular detail in FIGS. 4 to 6, the partitioning member 6 includes a large-diameter annular body 34 having a cylindrical outer peripheral surface 33 which is brought into contact with a cylindrical inner peripheral surface 32 of the hollow cylindrical portion 23 movably in the axial direction A; a small-diameter annular portion 36 projecting integrally in the A1 direction from a central portion of one end face 35 in the axial direction A of the annular body 34; and a plurality of, in this embodiment three, semi-cylindrical projections 37 projecting integrally in the A1 direction from an outer edge of the end face 35 of the annular body 34, and arranged at equiangular intervals in the R direction so as to mesh with the plurality of projections 26 without gaps in the R direction.

The annular body 34 has in its outer peripheral surface 33 an annular groove 39a to which an O-ring 38 adapted to be brought into resilient contact with the inner peripheral surface 32 is fitted, while an annular groove 40 which is open at one end face 39 in the axial direction A of the annular portion 36 is formed in the annular body 34 and the annular portion 36.

The partitioning member 6 is disposed in the vessel 2 movably in the axial direction A relative to the vessel 2 and immovably in the R direction owing to the meshing of the projections 37 with the projections 26, i.e., so as not to rotate in the R direction relative to the vessel 2. The partitioning member 6 defines the accommodation chamber 4 inside the vessel 2 in cooperation with the closure member 28 of the vessel 2.

As shown particularly in FIGS. 6 to 8 and FIGS. 9 to 11, the moving force imparting means 7 includes a rotatable member 41 disposed inside the vessel 2 rotatably in the R direction, as well as an inclined surface means 46 having pluralities of, i.e., in this embodiment respectively three, inclined surfaces 44 and 45 which are formed between one end face 42 in the axial direction A of the rotatable member 41 and another end face 43 in the axial direction A of the partitioning member 6 opposing the one end face 42 and which are inclined at an angle θ with respect to the axial direction A.

Figure 9:
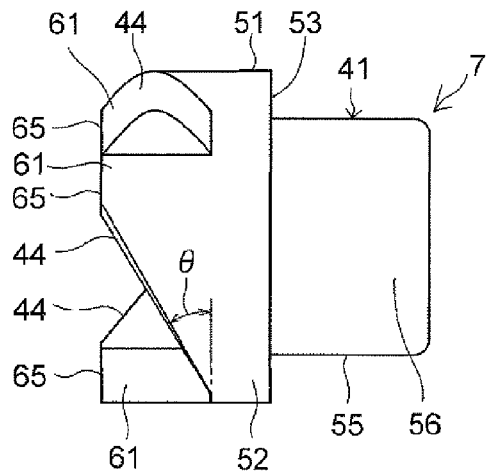
FIG. 9 is an explanatory partial side elevational view of the moving force imparting means in the embodiment shown in FIG. 1.
Figure 10:
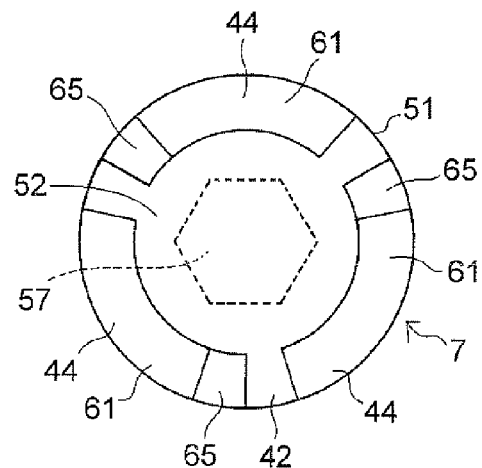
FIG. 10 is an explanatory partial left side elevational view of the moving force imparting means shown in FIG. 9.
Figure 11:
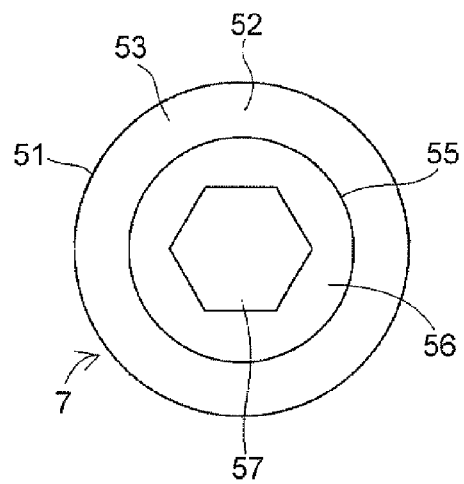
FIG. 11 is an explanatory partial right side elevational view of the moving force imparting means shown in FIG. 9.

As shown particularly in FIGS. 9 to 11, the rotatable member 41 includes a large-diameter annular body 52 having a cylindrical outer peripheral surface 51 which is brought into contact with the cylindrical inner peripheral surface 32 of the hollow cylindrical portion 23 rotatably in the R direction, as well as a small-diameter annular portion 56 having a cylindrical outer peripheral surface 55 which projects integrally in the A2 direction from a central portion of the other end face 53 in the axial direction A of the annular body 52 and is brought into contact with a cylindrical inner peripheral surface 54 of the inside diameter-side collar portion 21 rotatably in the R direction. The rotatable member 41 defines the accommodation chamber 5 inside the vessel 2 in cooperation with the partitioning member 6 and is adapted to not move in the A2 direction by coming into contact with the inside diameter-side collar portion 21 at its end face 53 rotatably in the R direction.

A sectionally hexagonal rotating shaft 58 is adapted to be fitted in a hexagonal bottomed groove 57 formed in central portions of the annular body 52 and the annular portion 56. The input of relative rotation about the axis O in the R direction with respect to the vessel 2 is adapted to be applied to the rotatable member 41 by the rotating shaft 58.

As shown particularly in FIGS. 6 to 8 and FIGS. 9 to 11, the inclined surface means 46 includes a plurality of, i.e., in this embodiment three, rotatable member projections 61 formed integrally on the one end face 42 of the rotatable member 41 projectingly in the A1 direction, and arranged at equiangular intervals about the axis O, as well as a plurality of, i.e., in this embodiment three, partitioning member projections 62 formed integrally on the other end face 43 of the partitioning member 6 projectingly in the A2 direction, and arranged at equiangular intervals about the axis O so as to mesh with the rotatable member projections 61.

Each rotatable member projection 61 has an apex surface 65 perpendicular to the axial direction A as well as the inclined surface 44 extending from the apex surface 65 with the angle θ in the R1 direction (clockwise in FIG. 10), i.e., one direction in the R direction, and terminating at the end face 42. Each partitioning member projection 62 has an apex surface 66 perpendicular to the axial direction A as well as the inclined surface 45 extending from the apex surface 66 with the angle θ in an R2 direction (clockwise in FIG. 7), i.e., the other direction in the R direction and terminating at the end face 43. Each apex surface 65 is adapted to be brought into contact with the end face 43, each inclined surface 44 is adapted to be brought into sliding contact with each corresponding inclined surface 45, and each apex surface 66 is adapted to be brought into contact with the end face 42. Thus, the inclined surfaces 44 and 45 are respectively formed on the rotatable member projections 61 and the partitioning member projections 62 so as to be brought into sliding contact with each other.

Figure 2:
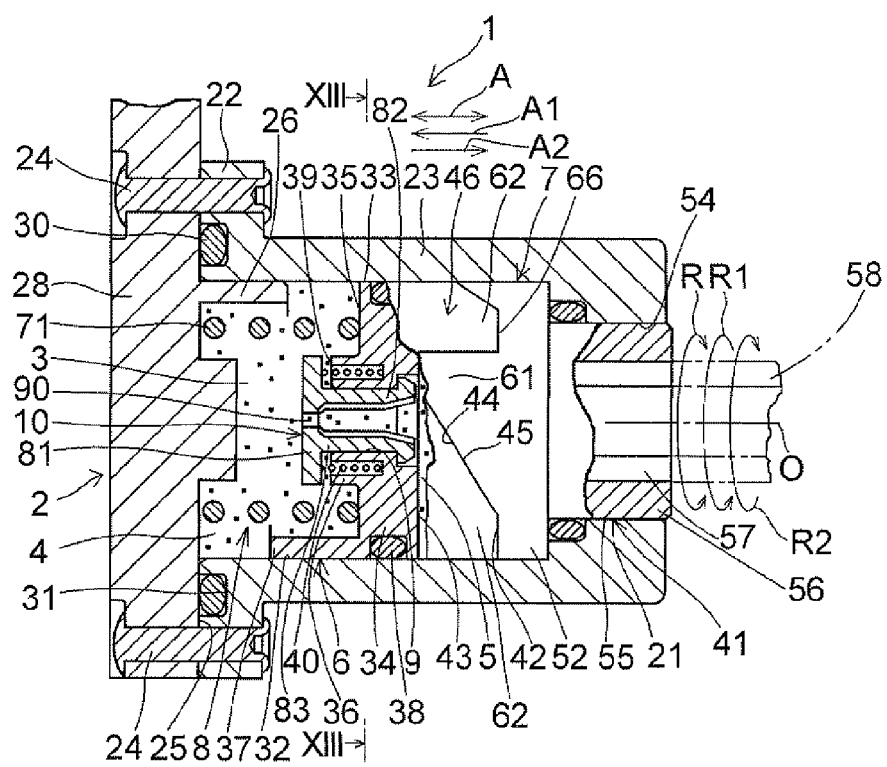
FIG. 2 is an explanatory side cross-sectional view of the embodiment shown in FIG. 1.
Figure 3:
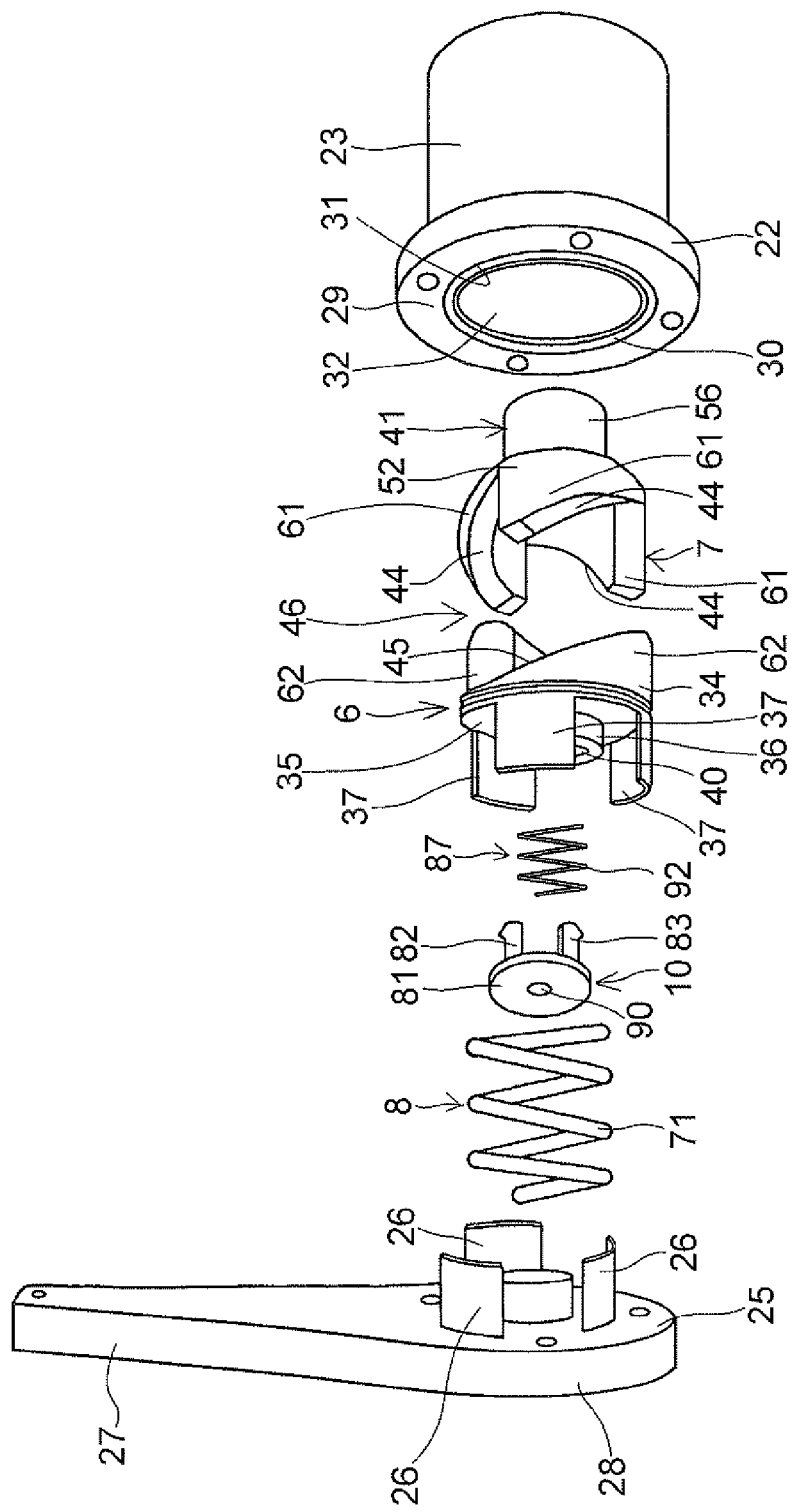
FIG. 3 is an explanatory exploded view of the embodiment shown in FIG. 1.
Figure 14:
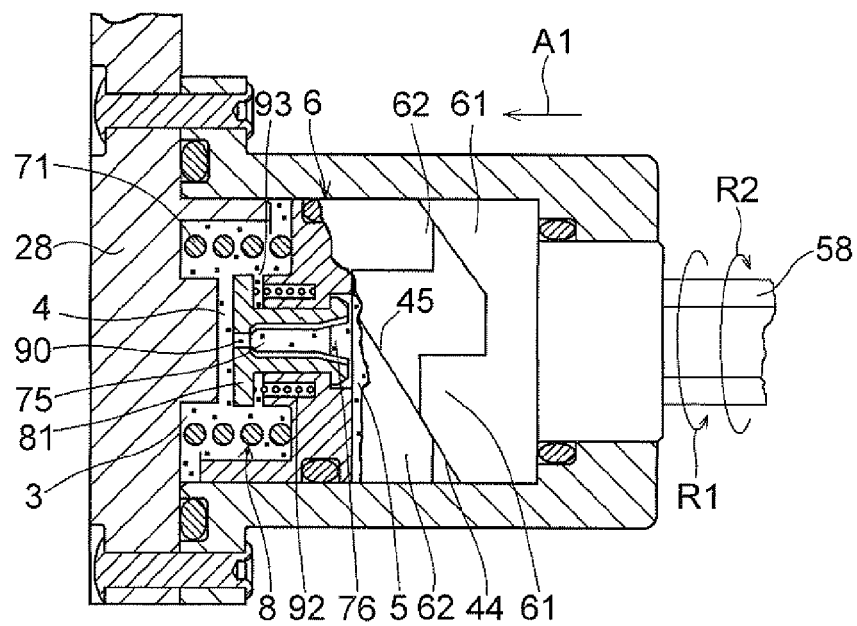
FIG. 14 is a diagram explaining the operation of the embodiment shown in FIG. 1.

When the rotatable member 41 is rotated in the same R1 direction by the input of rotation in the R1 direction from the rotating shaft 58, the moving force imparting means 7 presses the inclined surfaces 45 in the A1 direction while sliding on the inclined surfaces 45 at its inclined surfaces 44 rotating in the R1 direction, as shown in FIG. 14, to move the partitioning member 6 in the A1 direction against the resiliency from the resilient means 8. On the other hand, when the input of rotation in the R1 direction from the rotating shaft 58 is canceled, the inclined surfaces 45 are pressed against the inclined surfaces 44 in the A2 direction by the resiliency from the resilient means 8 through the partitioning member 6, thereby allowing the inclined surfaces 44 to rotate in the R2 direction while sliding on the inclined surfaces 45. As a result, as shown in FIG. 2, the apex surfaces 65 are brought into contact with the end face 43, while the apex surfaces 66 are brought into contact with the end face 42, so that the partitioning member 6 is returned to its original moving position, while the rotatable member 41 is returned to its original rotating position. Thus, the moving force in the A1 direction is adapted to be imparted to the partitioning member 6 by the input of relative rotation about the axis O in the R1 direction with respect to the vessel 2, so that the moving velocity is set to one corresponding to the rotating velocity in the R1 direction of the input of the rotation.

The resilient means 8 has a coil spring 71 disposed between the end face 25 of the closure member 28 and the end face 35 of the annular body 34 in such a manner as to be compressed with its ends in contact therewith and to surround the annular portion 36. The annular body 34 is urged in the A2 direction by the resiliency of the coil spring 71 to thereby impart a rotating returning force to the rotatable member 41 of the moving force imparting means 7.

The through hole 9 which is provided penetratingly through the centers of the annular body 34 and the annular portion 36 has a small-diameter circular hole 75 which is open at the end face 39 of the annular portion 36 and communicates with the accommodation chamber 4, as well as a large-diameter circular hole 76 which communicates with the circular hole 75, is open at the end face 43 of the annular body 34, and communicates with the accommodation chamber 5.

Figure 12:
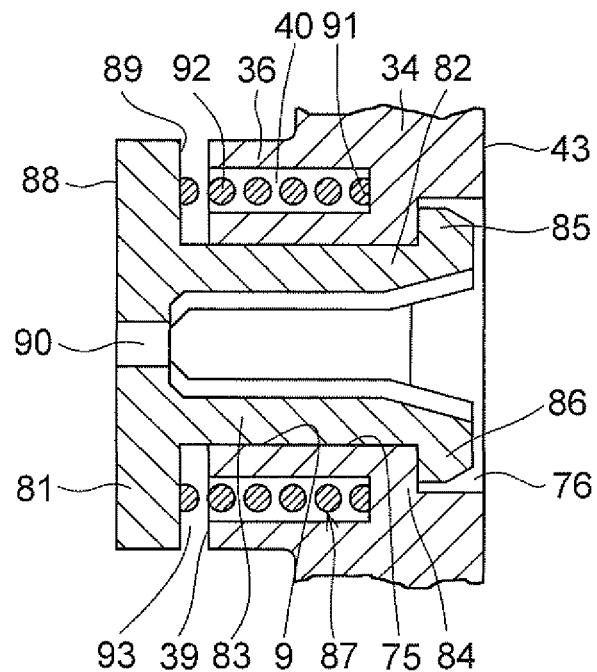
FIG. 12 is an explanatory side cross-sectional view of an allowing/limiting member and the like in the embodiment shown in FIG. 1.
Figure 13:
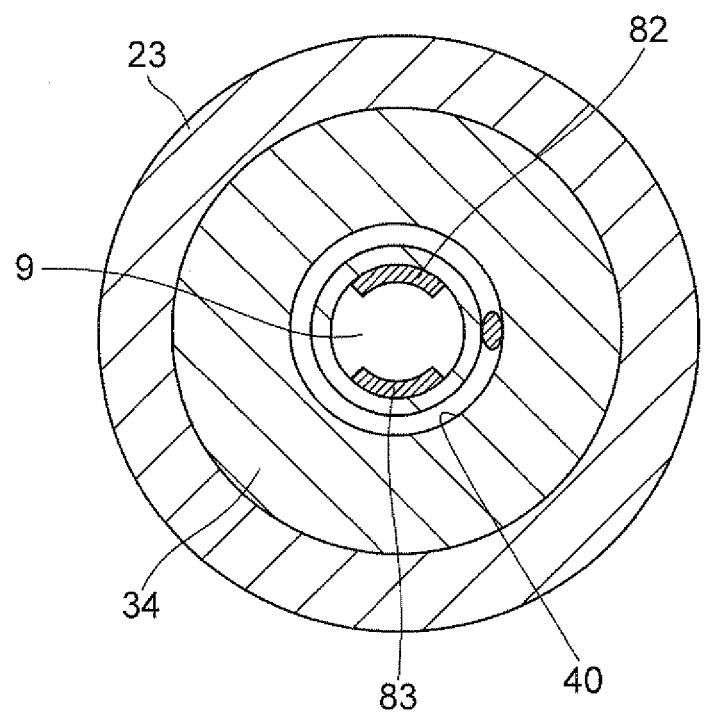
FIG. 13 is an explanatory cross-sectional view taken in the direction of arrows XIII-XIII shown in FIG. 2.

As shown particularly in FIGS. 12 and 13, the allowing/limiting member 10 includes a lid portion 81 which is opposed to one open end in the axial direction A of the circular hole 75 at the end face 39 of the annular portion 36 and is disposed movably in the axial direction A; a pair of mutually spaced-apart projections 82 and 83 formed integrally on the lid portion 81 projectingly in the A2 direction and fitted in the circular hole 75 and the circular hole 76 movably in the axial direction A; and engaging projections 85 and 86 formed integrally on respective leading ends of the projections 82 and 83 and projecting radially so as to engage an annular stepped portion 84 of the annular body 34 between the circular holes 75 and 76. The allowing/limiting member 10 is urged at its lid portion 81 in the A1 direction by a resilient means 87.

The lid portion 81 has a through hole 90 which is open at its one end face 88 in the axial direction A and at its other end face 89 in the axial direction A. The engaging projections 85 and 86 are engaged with the stepped portion 84 to prevent the projections 82 and 83 from coming off the circular holes 75 and 76 in the A1 direction.

Between the end face 89 of the lid portion 81 and a bottom wall surface 91 of the annular body 34 defining the bottom surface of the annular groove 40, the resilient means 87 has a coil spring 92 disposed by being compressed by the respective end portions in contact therewith and by surrounding the annular portion 36. The resilient means 87 is adapted to form an annular gap 93 communicating with the circular hole 75 and formed between the end face 89 of the lid portion 81 and the end face 39 of the annular portion 36 by the resiliency of the coil spring 92.

Figure 15:
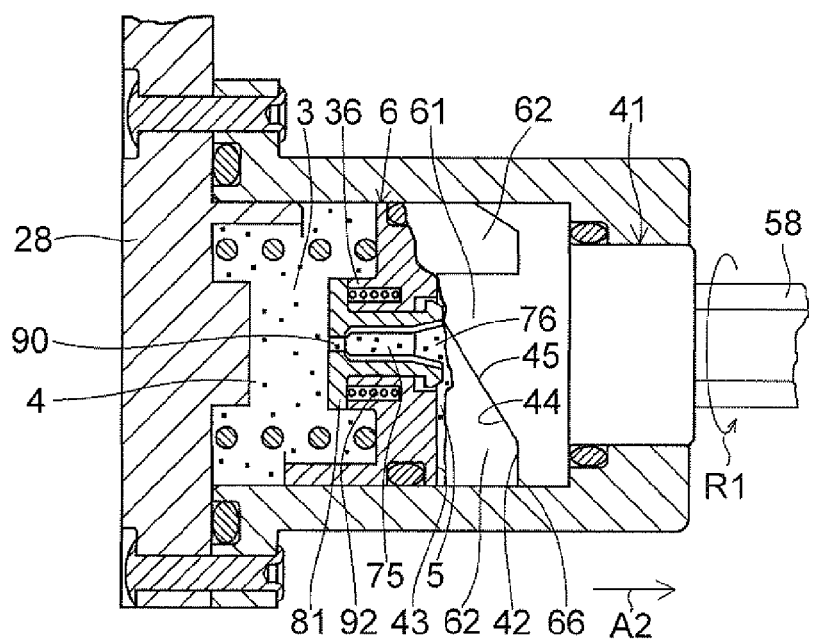
FIG. 15 is another diagram explaining the operation of the embodiment shown in FIG. 1.

In the slow low-speed movement in the A1 direction of the partitioning member 6 in which the internal pressure of the viscous fluid 3 in the accommodation chamber 4 does not become very large relative to the internal pressure of the viscous fluid 3 in the accommodation chamber 5, i.e., in the input of low-speed relative rotation in the R1 direction from the rotating shaft 58, the allowing/limiting member 10 allows the flow of the viscous fluid 3 from the accommodation chamber 4 into the accommodation chamber 5 through the circular holes 75 and 76 by means of the annular gap 93 in addition to the through hole 90 by maintaining the annular gap 93 by the resiliency of the coil spring 92, as shown in FIG. 14, thereby generating a small resisting force with respect to the slow movement in the A1 direction of the partitioning member 6. On the other hand, in the high-speed movement in the A1 direction of the partitioning member 6 in which the internal pressure of the viscous fluid 3 in the accommodation chamber 4 becomes extremely large relative to the internal pressure of the viscous fluid 3 in the accommodation chamber 5, i.e., in the input of high-speed relative rotation in the R1 direction from the rotating shaft 58, the allowing/limiting member 10 limits the flow of the viscous fluid 3 from the accommodation chamber 4 into the accommodation chamber 5 through the circular holes 75 and 76 such that this flow is effected only through the through hole 90. This is effected as follows: As shown in FIG. 15, the lid portion 81 is moved in the A2 direction against the resiliency of the coil spring 92 owing to the difference between the pressure receiving areas of the end faces 88 and 89 of the lid portion 81 with respect to the internal pressure of the viscous fluid 3 in the accommodation chamber 4, and the end face 89 of the lid portion 81 is thereby brought into contact with the end face 39 of the annular portion 36 to eliminate the annular gap 93, whereby the communication between the accommodation chamber 4 and the accommodation chamber 5 through the annular gap 93 is inhibited, and the accommodation chamber 4 and the accommodation chamber 5 are communicated with each other only through the through hole 90. Hence, the high-speed movement of the partitioning member 6 in the A1 direction generates a large resistance force, with the result that the rotation in the A1 direction of the rotatable member 41 due to the input of the relative high-speed rotation in the R1 direction from the rotating shaft 58 is hampered through the partitioning member 6. Thus, the impact-absorbed body which rotates the rotating shaft 58 is held reliably.

Figure 16:
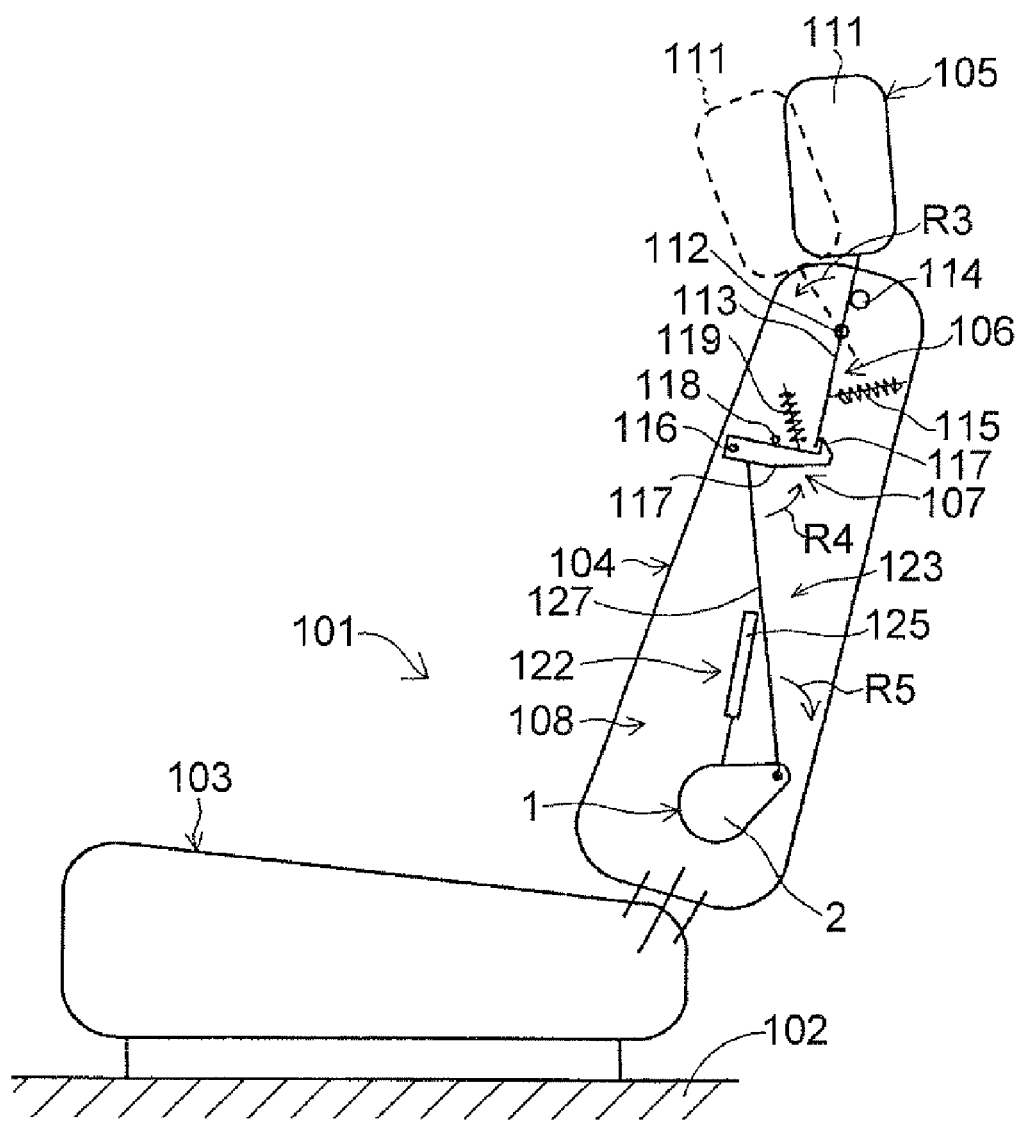
FIG. 16 is an explanatory side elevational view of an embodiment in which the embodiment shown in FIG. 1 is used in a vehicle seat.
Figure 17:
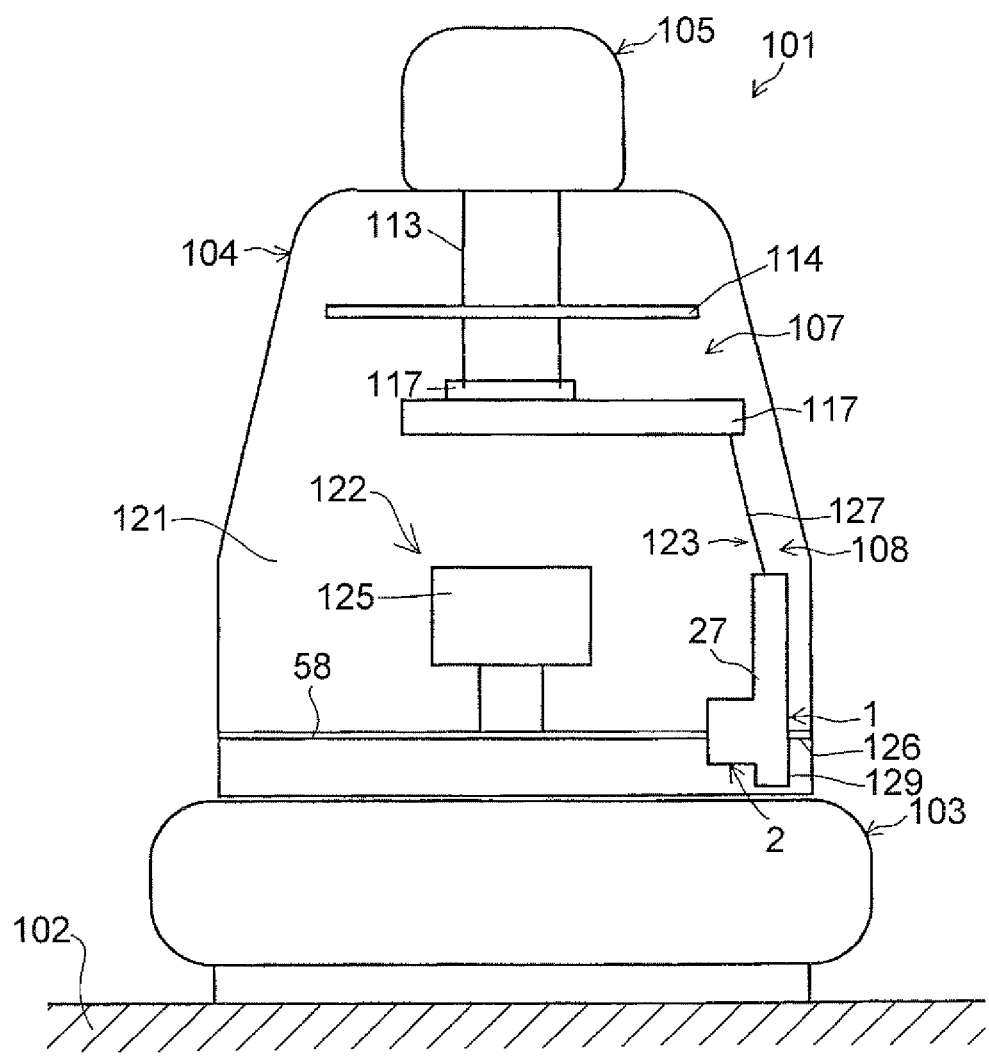
FIG. 17 is an explanatory front elevational view of the embodiment shown in FIG. 16.

The above-described damper 1 may be used for a vehicle seat 101, as shown in FIGS. 16 and 17. Namely, the vehicle seat 101 in accordance with this embodiment is comprised of a seat 103 mounted on a floor 102 of a vehicle such that its front-back position and inclined position are adjustable; a vehicle backrest 104 installed to the seat 103 such that its inclined position is adjustable; a headrest 105 supported by the backrest 104 movably in the forward direction, i.e., rotatably in the forward direction in this embodiment; a rotatively urging means 106 for rotatively urging the headrest 105 in a forward R3 direction; an inhibition mechanism 107 for inhibiting the rotation of the headrest 105 in the R3 direction; and a canceling means 108 for canceling the inhibition by the inhibition mechanism 107 of the movement of the headrest 105 in the R3 direction when the moving velocity applied to the backrest 104 in the backward direction of the vehicle has exceeded a fixed value.

Since the mechanism of mounting the seat 103 on the floor 102 such that its front-back position and inclined position are adjustable and the mechanism of installing the backrest 104 to the seat 103 such that its inclined position is adjustable are publicly known, a detailed description thereof will be omitted.

The headrest 105 has a headrest body 111 and a supporting member 113 which is secured to the headrest body 111 and is supported by a frame (not shown) of the backrest 104 rotatably in the R3 direction by means of a shaft 112. The supporting member 113 is adapted to not rotate in an opposite direction to the R3 direction by a stopper 114 secured to the frame of the backrest 104.

The rotatively urging means 106 serving as a movement urging means has a coil spring 115 having one end secured to the frame of the backrest 104 and the other end secured to the supporting member 113, so as to constantly urge the headrest 105 rotatively in the R3 direction by the resiliency of the coil spring 115.

The inhibition mechanism 107 has a hook member 117 which is supported by a frame of the backrest 104 by means of a shaft 116 rotatably in an R4 direction and abuts against and engages a leading end of the supporting member 113 so as to inhibit the rotation of the supporting member 113 in the R3 direction, as well as a stopper 118 and a coil spring 119 for setting the hook member 117 to an abutting and engaging position with respect to the leading end of the supporting member 113.

The canceling means 108 has a load-rotation converting mechanism 122 which is displaced by the load applied to a back receiving portion 121 of the backrest 104 from an occupant seated in the seat 103 and a transmitting mechanism 123 which transmits to the inhibition mechanism 107 a force on the basis of the moving velocity applied to the back receiving portion 121 of the backrest 104 in the backward direction of the vehicle and exceeding a fixed value, but which does not transmit to the inhibition mechanism 107 the force applied to the back receiving portion 121 of the backrest 104 on the basis of its velocity of the fixed value or less.

The load-rotation converting mechanism 122 has the rotating shaft 58 supported rotatably by the frame of the backrest 104 and a load receiving plate 125 secured to the rotating shaft 58 and disposed in the back receiving portion 121 of the backrest 104. The load receiving plate 125 supported rotatably by the frame of the backrest 104 by means of the rotating shaft 58 is embedded in a cushion in the back receiving portion 121 of the backrest 104.

The transmitting mechanism 123 has the damper 1 which is supported rotatably in an R5 direction at the closure member 28 of the vessel 2 by a supporting shaft 126 supported by the frame of the backrest 104, as well as a wire 127 having one end coupled to the arm member 27 of the damper 1 and the other end coupled to the hook member 117.

In the damper 1 in accordance with this embodiment, a recess for receiving one end of the supporting shaft 126 is formed in the other end face 129 of the closure member 28, and the damper 1 is supported by the frame of the backrest 104 rotatably about the supporting shaft 126 in the R5 direction through the above-described supporting shaft 126 and the recess. The rotating shaft 58 having a hexagonal cross section is fitted in the hexagonal bottomed groove 57 in the central portions of the annular body 52 and the annular portion 56.

In the above-described vehicle seat 101, in a case where the occupant is seated in the seat 103 and the occupant's normal load is applied to the backrest 104 in the backward direction of the vehicle, or in a case where the occupant's load is added to the backrest 104 in the backward direction of the vehicle due to the normal acceleration of the vehicle for the occupant seated in the seat 103, these loads upon the backrest 104 are applied slowly at a velocity of a fixed value or less. As a result, the load receiving plate 125 which receives such a load of the occupant is rotated slowly about the rotating shaft 58 in the R5 direction. This slow rotation of the load receiving plate 125 produces slow flow of the viscous fluid 3 from the accommodation chamber 4 into the accommodation chamber 5 through the annular gap 93 in addition to the through hole 90. In consequence, the load receiving plate 125 and, hence, the backrest 104 are subjected to a moderate impact. Meanwhile, in such slow rotation of the load receiving plate 125, the rotatable member 41 is idled in the R1 direction with respect to the partitioning member 6 by the inclined surface means 46, so that the rotatable member 41 and the vessel 2 are set in a non-coupled state with respect to the rotation in the R1 direction. As a result, a tensile force which produces the rotation in the R4 direction of the hook member 117 such as to cancel the abutment and engagement with the leading end of the supporting member 113 is not produced in the wire 127 through the vessel 2. Thus, the inhibition mechanism 107 inhibits the rotation of the headrest 105 in the forward R3 direction, thereby maintaining the headrest 105 in its normal position.

On the other hand, with the vehicle seat 101, when, upon a collision from the rear, a large velocity in the backward direction exceeding a fixed value has occurred in the occupant seated in the seat 103, and the load receiving plate 125 is suddenly rotated about the rotating shaft 58 in the R1 direction, this rotation of the rotating shaft 58 in the R1 direction at the velocity exceeding the fixed value limits the flow of the viscous fluid 3 from the accommodation chamber 4 into the accommodation chamber 5 through the circular holes 75 and 76. As a result, the rotatable member 41 and the vessel 2 are set in a coupled state with respect to the rotation in the R1 direction through the partitioning member 6. In consequence, such rotation of the rotating shaft 58 in the R1 direction at a velocity exceeding the fixed value causes the vessel 2 to undergo the rotation about the supporting shaft 126 in the R1 direction through the rotatable member 41 and the partitioning member 6. Thus, a tensile force producing the rotation of the hook member 117 so as to cancel the abutment and engagement with the leading end of the supporting member 113 is produced in the wire 127. Hence, the hook member 117 of the inhibition mechanism 107 is rotated about the shaft 116 in an opposite direction to the R4 direction so as to cancel the abutment and engagement with the leading end of the supporting member 113, with the result that the headrest 105 is rotated in the R3 direction by being urged by the coil spring 115 so as to hold the occupant's head.

Thus, the vehicle seat 101 has the transmitting mechanism 123 having the damper 1 serving as a switching mechanism whereby the force on the basis of the velocity applied to the backrest 104 in the backward direction of the vehicle and exceeding a fixed value is transmitted to the inhibition mechanism 107 so as to cancel the inhibition by the inhibition mechanism 107 of the rotation of the headrest 105 in the forward R3 direction, whereas the force on the basis of the velocity applied to the backrest 104 and being the fixed value or less is not transmitted to the inhibition mechanism 107. Therefore, it is possible to positively move the headrest 105 in the forward R3 direction only at the time of such as a collision by properly discriminating the time of such as a collision and the time of a non-collision.

In the example of the above-described seat 101, the resetting of the abutment and engagement of the leading end of the supporting member 113 with respect to the hook member 117 can be effected if, after the movement of the headrest 105 in the forward R3 direction, the headrest 105 is forcibly rotated in the opposite direction to the R3 direction to allow the leading end of the supporting member 113 to slide on an inclined surface of the hook member 117 and to reversely rotate the hook member 117. It should be noted that although the wire 127 is used in the above-described embodiment, it is possible to alternatively use a gear mechanism, a rack and pinion mechanism, or the like.

Figure 18:
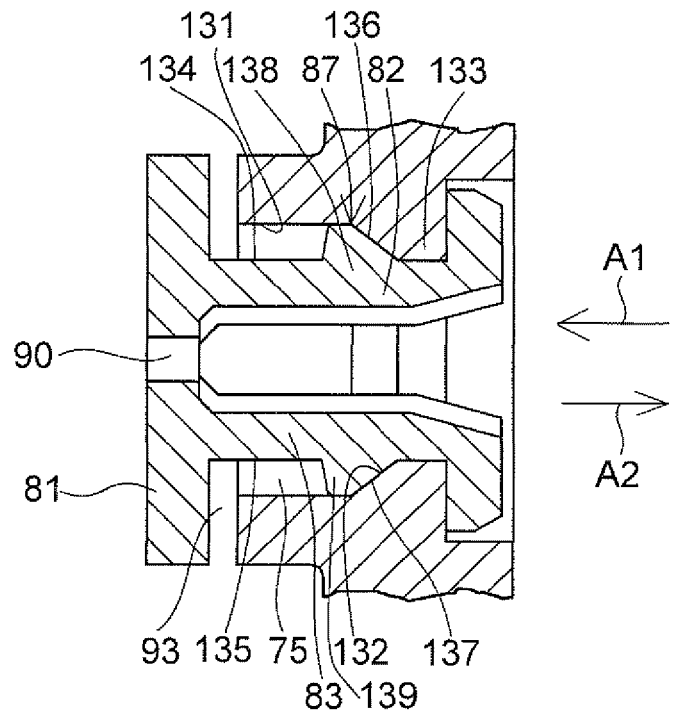
FIG. 18 is an explanatory partial side cross-sectional view of another preferred embodiment in accordance with the invention.
Figure 19:
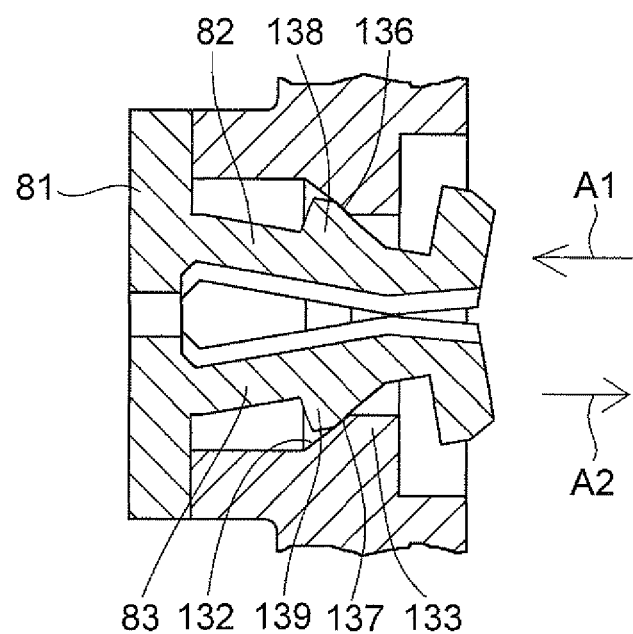
FIG. 19 is a diagram explaining the operation of the embodiment shown in FIG. 18.

In addition, although, in the allowing/limiting member 10, the coil spring 92 is used as the resilient means 87, in substitution thereof or in conjunction therewith, the resilient means 87 may be constructed as shown in FIG. 18. Namely, the resilient means 87 shown in FIG. 18 includes an annular projection 133 which is formed integrally with an inner peripheral surface 131 of the annular body 34 and the annular portion 36 defining the circular hole 75 and which has an inclined surface 132 inclined in such a manner as to project gradually inward toward the A2 direction; projections 138 and 139 which are formed integrally with respective outer peripheral surfaces 134 and 135 of the projections 82 and 83 and have inclined surfaces 136 and 137 of a shape complementary to the inclined surface 132 and in sliding contact with the inclined surface 132; and the elastic deformation characteristics of the projections 82 and 83. With such a resilient means 87 shown in FIG. 18, in a case where the internal pressure of the viscous fluid 3 in the accommodation chamber 4 has become extremely large relative to the internal pressure of the viscous fluid 3 in the accommodation chamber 5, and the lid portion 81 is hence moved in the A2 direction, as shown in FIG. 19, in the sliding contact movement of the inclined surfaces 136 and 137 onto the inclined surface 132 along with the movement of the lid portion 81 in the A2 direction, the projections 138 and 139 are moved inwardly in the A2 direction, while being guided by the inclined surface 132 of the projection 133, whereby the projections 82 and 83 are elastically deformed inwardly, so that an elastically restoring force is accumulated. Meanwhile, when the internal pressure of the viscous fluid 3 in the accommodation chamber 4 assumes a level comparable to the internal pressure of the viscous fluid 3 in the accommodation chamber 5, the projections 138 and 139 are moved outwardly in the A1 direction, while being guided by the inclined surface 132 of the projection 133, by the elastic restoring force of the elastically deformed projections 82 and 83. As a result, the lid portion 81 is adapted to be returned to its original position by being moved in the A1 direction. In the invention, the resilient means 87 may thus be embodied by using the elastic deformation characteristics of the projections 82 and 83.

Furthermore, in the invention, in substitution of the through hole 90 or in addition to the through hole 90, a radial groove may be provided in the end face 39 to allow communication between the through hole 9 and the accommodation chamber 4. Still alternatively, the flow of the viscous fluid 3 between the accommodation chamber 5 and the accommodation chamber 4 may be effected through the annular gap 93 by forming the lid portion 81 without providing such a groove and without the provision of the through hole 90.

The invention claimed is:

1. A damper comprising:
    a vessel;
    a partitioning member which partitions an interior of said vessel into two accommodation chambers for accommodating a viscous fluid, and which rotates together with said vessel about an axis of said vessel and is movable in an axial direction of said vessel;
    moving force imparting means for imparting to said partitioning member a moving force in one axial direction by an input of relative rotation about the axis of said vessel with respect to said vessel, so that a moving velocity of said partitioning member to which the moving force is imparted is set to one corresponding to a rotating velocity of the input of rotation;
    first resilient means for resiliently urging said partitioning member in another axial direction;
    a through hole formed in said partitioning member so as to allow the two accommodation chambers inside said vessel to communicate with each other;
    an allowing/limiting member which is resiliently urged in the one axial direction to allow the viscous fluid accommodated in said two accommodation chambers in said vessel to flow reciprocally between said two accommodation chambers through said through hole, and which limits the flow of the viscous fluid in said accommodation chamber in the one axial direction into said accommodation chamber in the other axial direction through said through hole against the resilient urge in the one axial direction allowing that flow, when the internal pressure of the viscous fluid accommodated in said accommodation chamber in the one axial direction is generated in excess of a fixed value on a basis of the movement of said partitioning member in the one axial direction, said allowing/limiting member having a lid portion which is opposed to an axial one open end of said through hole at an axial other end face of said partitioning member and is disposed movably in the axial direction, and at least a pair of mutually spaced-apart projections formed integrally on said lid portion projectingly in the other axial direction and fitted in said through hole movably in the axial direction, and
    second resilient means for urging said lid portion in the one axial direction.

2. The damper according to claim 1, wherein said moving force imparting means includes a rotatable member disposed rotatably in said vessel; and inclined surface means having inclined surfaces which are formed between an axial one end face of said rotatable member and an axial one end face of said partitioning member opposing the axial one end face of said rotatable member and which are inclined with respect to the axial direction.

3. The damper according to claim 2, wherein said inclined surface means includes a plurality of rotatable member projections formed integrally on the one end face of said rotatable member projectingly in the one axial direction, and arranged in a direction about the axis, and a plurality of partitioning member projections formed integrally on the one end face of said partitioning member projectingly in the other axial direction, and arranged in the direction about the axis so as to mesh with the rotatable member projections, and wherein the inclined surfaces are formed on the rotatable member projections and the partitioning member projections, respectively, so as to be brought into sliding contact with each other.

4. A vehicle seat comprising:
a backrest of a vehicle;
a headrest supported by said backrest movably in a forward direction of the vehicle;
movement urging means for urging said headrest to move in the forward direction;
an inhibition mechanism for inhibiting the movement of said headrest in the forward direction; and
canceling means for canceling the inhibition by said inhibition mechanism of the movement of said headrest in the forward direction when a moving velocity applied to said backrest in a backward direction of the vehicle has exceeded a fixed value,
said canceling means having a load-rotation converting mechanism for converting a load applied to a back receiving portion of said backrest into a rotational force and a transmitting mechanism for transmitting to said inhibition mechanism the force on a basis of the moving velocity applied to said backrest in the backward direction of the vehicle and exceeding the fixed value,
said transmitting mechanism having a damper according to claim 1,
wherein one of said vessel and said partitioning member of said damper is coupled to said load-rotation converting mechanism so as to receive the rotational force from said load-rotation converting mechanism as the input of rotation, and another one of said vessel and said partitioning member of said damper is coupled to said inhibition mechanism so as to transmit to said inhibition mechanism the force on the basis of the moving velocity applied to said backrest in the backward direction of the vehicle and exceeding the fixed value.

5. The vehicle seat according to claim 4, wherein said load-rotation converting mechanism has a load receiving plate supported rotatably by a frame of said backrest and disposed in the back receiving portion of said backrest.

6. The vehicle seat according to claim 4, wherein said headrest is supported by said backrest forwardly rotatably or translatably, said movement urging means is adapted to urge said headrest to forwardly rotate or translate, and said inhibition mechanism is adapted to inhibit the rotation or translation of said headrest in the forward direction.

7. A vehicle seat comprising:
a backrest of a vehicle;
a headrest supported by said backrest movably in a forward direction of the vehicle;
movement urging means for urging said headrest to move in the forward direction;
an inhibition mechanism for inhibiting the movement of said headrest in the forward direction; and
canceling means for canceling the inhibition by said inhibition mechanism of the movement of said headrest in the forward direction when a moving velocity applied to said backrest in a backward direction of the vehicle has exceeded a fixed value,
said canceling means having a load-rotation converting mechanism for converting a load applied to a back receiving portion of said backrest into a rotational force and a transmitting mechanism for transmitting to said inhibition mechanism the force on a basis of the moving velocity applied to said backrest in the backward direction of the vehicle and exceeding the fixed value,
said transmitting mechanism having a damper which comprises:
a vessel,
a partitioning member which partitions an interior of said vessel into two accommodation chambers for accommodating a viscous fluid, and which rotates together with said vessel about an axis of said vessel and is movable in an axial direction of said vessel,
moving force imparting means for imparting to said partitioning member a moving force in one axial direction by an input of relative rotation about the axis of said vessel with respect to said vessel, so that a moving velocity of said partitioning member to which the moving force is imparted is set to one corresponding to a rotating velocity of the input of rotation,
resilient means for resiliently urging said partitioning member in another axial direction,
a through hole formed in said partitioning member so as to allow the two accommodation chambers inside said vessel to communicate with each other, and
an allowing/limiting member which is resiliently urged in the one axial direction to allow the viscous fluid accommodated in said two accommodation chambers in said vessel to flow reciprocally between said two accommodation chambers through said through hole, and which limits the flow of the viscous fluid in said accommodation chamber in the one axial direction into said accommodation chamber in the other axial direction through said through hole against the resilient urge in the one axial direction allowing that flow, when the internal pressure of the viscous fluid accommodated in said accommodation chamber in the one axial direction is generated in excess of a fixed value on a basis of the movement of said partitioning member in the one axial direction,
wherein one of said vessel and said partitioning member of said damper is coupled to said load-rotation converting mechanism so as to receive the rotational force from said load-rotation converting mechanism as the input of rotation, and another one of said vessel and said partitioning member of said damper is coupled to said inhibition mechanism so as to transmit to said inhibition mechanism the force on the basis of the moving velocity applied to said backrest in the backward direction of the vehicle and exceeding the fixed value.

8. A vehicle seat according to claim 7, wherein said load-rotation converting mechanism having a load receiving plate supported rotatably by a frame of said backrest and disposed in the back receiving portion of said backrest.

9. A vehicle seat according to claim 7, wherein said headrest is supported by said backrest forwardly rotatably or translatably, said movement urging means is adapted to urge said headrest to forwardly rotate or translate, and said inhibition mechanism is adapted to inhibit the rotation or translation of said headrest in the forward direction.

* * * * *

UNITED STATES PATENT AND TRADEMARK OFFICE
CERTIFICATE OF CORRECTION

PATENT NO. : 8,210,609 B2  Page 1 of 1
APPLICATION NO. : 12/597212
DATED : July 3, 2012
INVENTOR(S) : Okimura et al.

It is certified that error appears in the above-identified patent and that said Letters Patent is hereby corrected as shown below:

On Title page item [56], "FOREIGN PATENT DOCUMENTS" should be listed as follows:

JP    17268/1983    8/1984

Signed and Sealed this
Thirtieth Day of October, 2012

David J. Kappos
*Director of the United States Patent and Trademark Office*